United States Patent
Kordes et al.

(10) Patent No.: US 10,906,749 B2
(45) Date of Patent: Feb. 2, 2021

(54) DEVICE FOR APPLYING OIL TO A CHAIN OF A TWO-WHEELER, IN PARTICULAR A BICYCLE

(71) Applicant: SKS metaplast Scheffer-Klute GmbH, Sundern (DE)

(72) Inventors: Sven Kordes, Sundern (DE); Karsten Grabski, Ense (DE); Rolf Schweineberg, Arnsberg (DE)

(73) Assignee: SKS metaplast Scheffer-Klute GmbH, Sundern (DE)

( * ) Notice: Subject to any disclaimer, the term of this patent is extended or adjusted under 35 U.S.C. 154(b) by 124 days.

(21) Appl. No.: 15/710,601

(22) Filed: Sep. 20, 2017

(65) Prior Publication Data

US 2018/0162653 A1   Jun. 14, 2018

(30) Foreign Application Priority Data

Jul. 20, 2016 (DE) .................... 20 2016 103 943 U
Dec. 22, 2016 (DE) .................... 20 2016 107 296 U

(51) Int. Cl.
| | |
|---|---|
| *B65G 45/08* | (2006.01) |
| *B62J 31/00* | (2006.01) |
| *F16N 9/00* | (2006.01) |
| *B05C 1/04* | (2006.01) |
| *F16N 3/04* | (2006.01) |
| *F16H 57/05* | (2006.01) |

(52) U.S. Cl.
CPC ............... *B65G 45/08* (2013.01); *B05C 1/04* (2013.01); *B62J 31/00* (2013.01); *F16H 57/05* (2013.01); *F16N 3/04* (2013.01); *F16N 9/00* (2013.01); *F16N 2210/33* (2013.01)

(58) Field of Classification Search
CPC ...... B62J 31/00; F16N 2210/33; F16H 57/05; B62D 83/303; B65G 45/08

USPC ......................................................... 184/15.1
See application file for complete search history.

(56) References Cited

U.S. PATENT DOCUMENTS

| | | | | |
|---|---|---|---|---|
| 2,951,557 | A | * | 9/1960 | Jung .................. F16H 57/05 184/102 |
| 3,503,470 | A | * | 3/1970 | Lister .................. B65G 45/08 184/55.1 |
| 3,934,677 | A | * | 1/1976 | Schott .................. B62J 31/00 184/15.1 |
| 4,578,120 | A | * | 3/1986 | Chiarella ................ B62J 31/00 134/9 |

(Continued)

FOREIGN PATENT DOCUMENTS

| | | |
|---|---|---|
| DE | 102010043383 A1 | 5/2012 |
| JP | 4724769 U | 11/1972 |
| WO | 2014036351 A1 | 3/2014 |

OTHER PUBLICATIONS

U.S. Pat. No. 840,345A (Max Klemm), Patented Jan. 1, 1907.
Search Report in corresponding European Patent Application No. 17192186, dated Dec. 19, 2017, with English translation.

*Primary Examiner* — Henry Y Liu
(74) *Attorney, Agent, or Firm* — Edell, Shapiro & Finnan, LLC

(57) ABSTRACT

A device for applying oil on a chain of a two-wheeler, such as a bicycle (10), comprises: a container for the oil to be applied; an outlet through which the oil may exit from the container; and an applicator configured to repeatedly open and close the outlet during a movement of the device relative to the chain in the longitudinal direction of the chain so that the oil located in the container is applied incrementally to the chain.

21 Claims, 9 Drawing Sheets

(56) References Cited

U.S. PATENT DOCUMENTS

| | | | |
|---|---|---|---|
| 4,783,186 A * | 11/1988 | Manning | A46B 11/0017 184/15.1 |
| 4,815,637 A * | 3/1989 | Nellis | B62J 31/00 184/15.1 |
| 4,891,037 A * | 1/1990 | Maples | B62J 31/00 184/15.1 |
| 5,020,637 A * | 6/1991 | Hoenselaar | B62J 31/00 184/15.1 |
| 5,269,614 A * | 12/1993 | Taylor | B62J 31/00 184/15.1 |
| 5,443,139 A * | 8/1995 | Scott | B62J 31/00 184/15.1 |
| 5,484,038 A * | 1/1996 | Rowell | B62J 31/00 184/15.1 |
| 5,647,456 A * | 7/1997 | Gelb | B62J 31/00 184/15.2 |
| 5,934,411 A * | 8/1999 | Murano | F16N 13/06 184/11.5 |
| 6,419,078 B1 * | 7/2002 | Leathers | B65G 45/08 184/15.2 |
| 6,942,409 B2 * | 9/2005 | Barbieri | A46B 5/0012 184/15.1 |
| 8,181,747 B2 * | 5/2012 | Feldstein | B08B 3/022 134/15 |
| 8,757,325 B2 * | 6/2014 | Singer | B05C 1/04 184/11.5 |
| 9,079,720 B1 * | 7/2015 | Schmidt | F16H 57/05 |
| 9,334,947 B2 * | 5/2016 | Varghese | B62J 31/00 |
| 2009/0223745 A1 * | 9/2009 | Marcucci | B62J 31/00 184/15.2 |
| 2010/0101607 A1 * | 4/2010 | Feldstein | B08B 3/022 134/15 |
| 2014/0060973 A1 * | 3/2014 | Singer | B05C 1/04 184/15.1 |

* cited by examiner

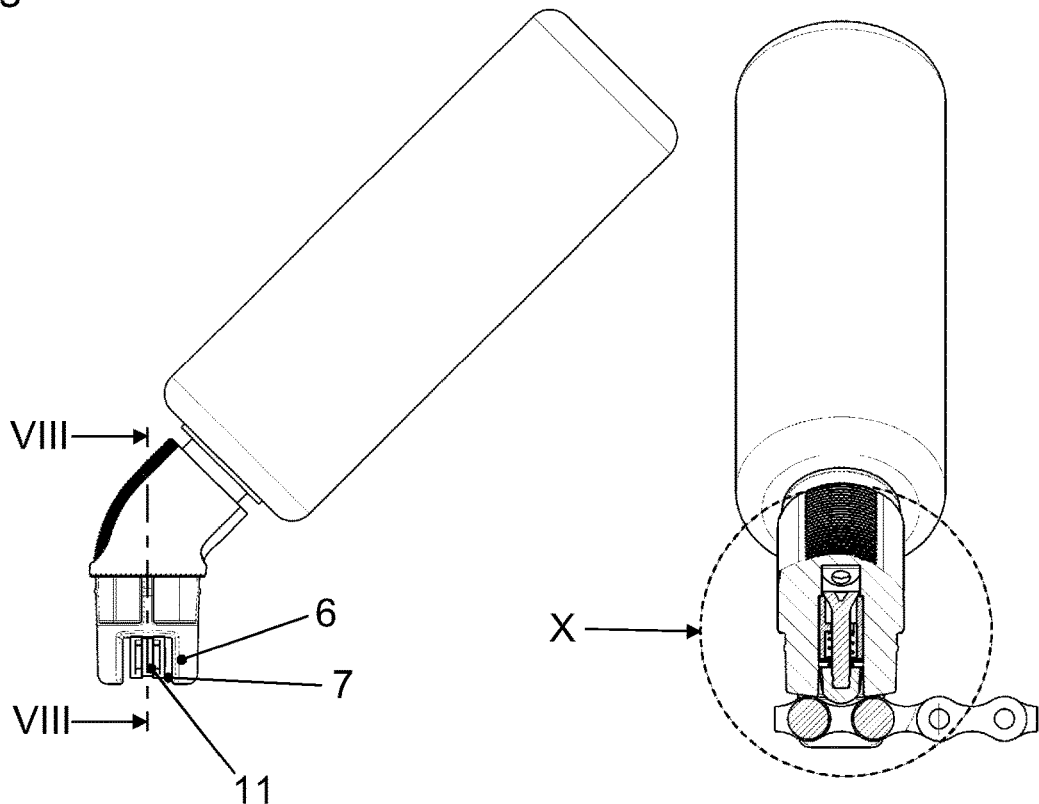
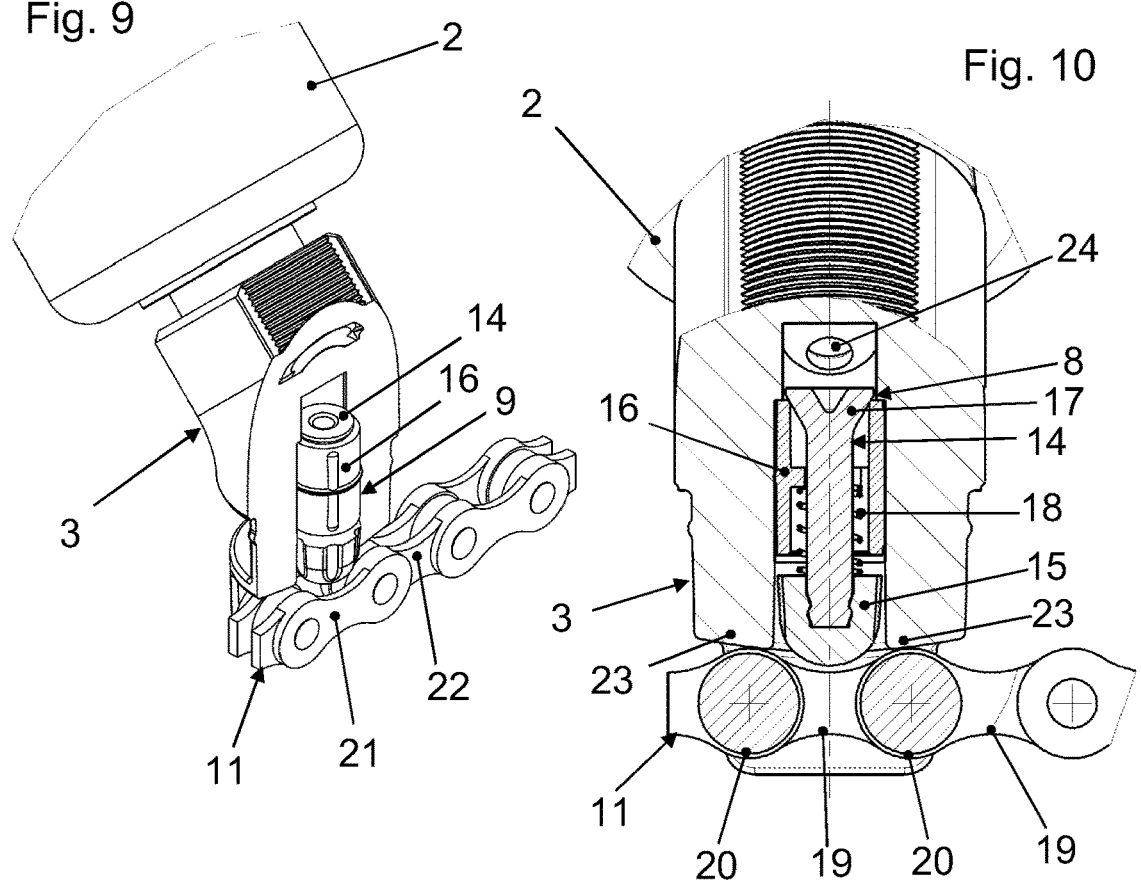

Fig. 11
Fig. 12
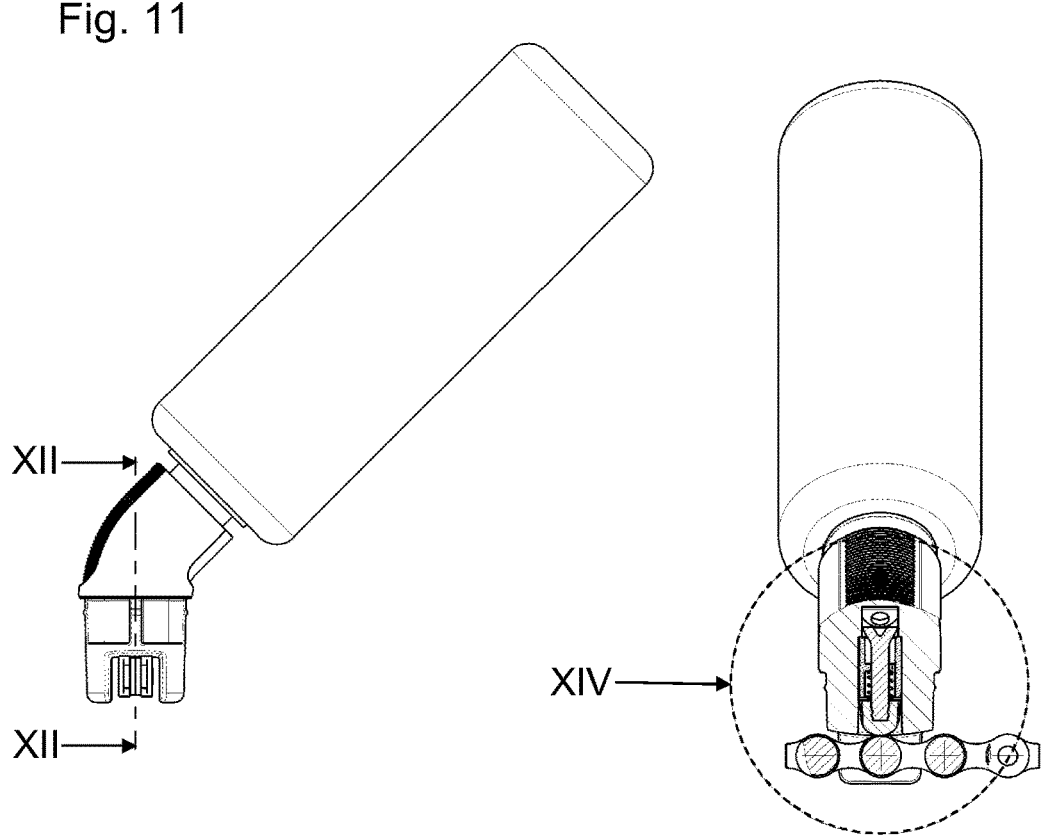
Fig. 13
Fig. 14
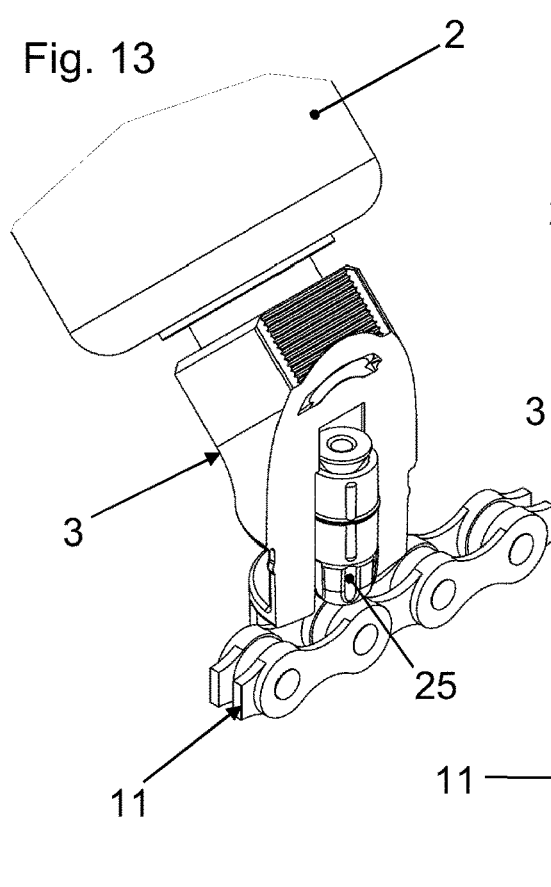
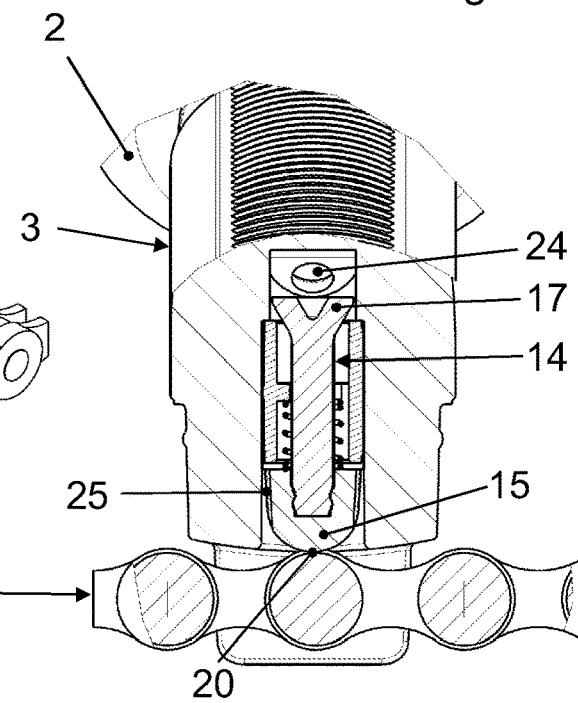

Fig. 25
Fig. 26
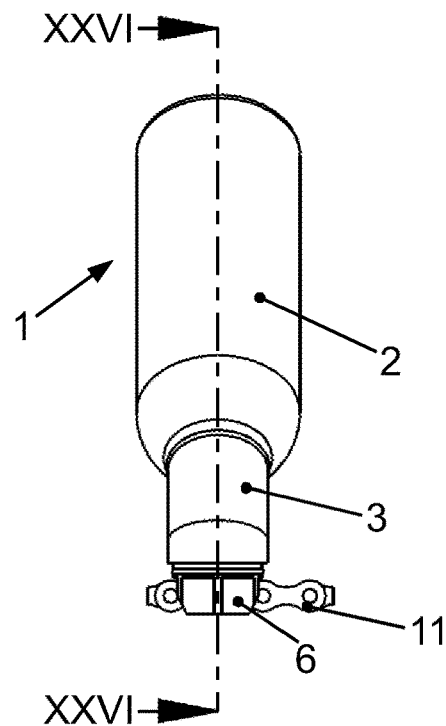
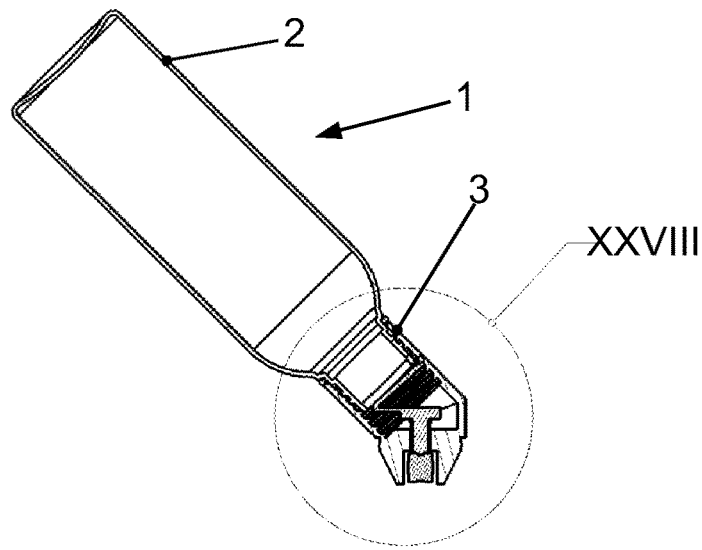
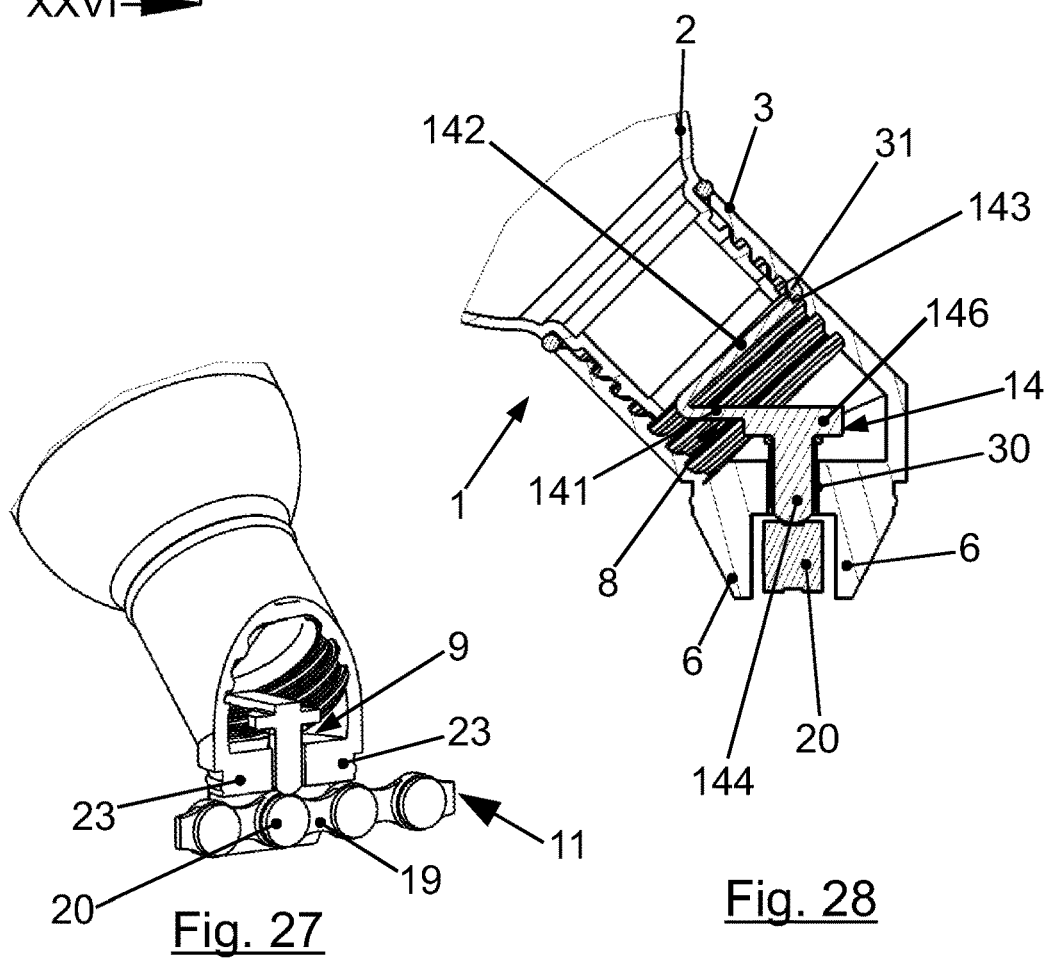
Fig. 27
Fig. 28

DEVICE FOR APPLYING OIL TO A CHAIN OF A TWO-WHEELER, IN PARTICULAR A BICYCLE

CROSS REFERENCE TO RELATED APPLICATIONS

This application claims foreign priority under 35 U.S.C. § 119(a)-(d) to Application No. DE 202016103943.6 filed on Jul. 20, 2016, and also Application No. DE 202016107296.4 filed on Dec. 22, 2016, the entire contents of which are hereby incorporated by reference.

TECHNICAL FIELD

The present invention relates to a device for applying oil to a chain of a two-wheeler, in particular a bicycle.

BACKGROUND

Devices for applying oil to the chain of bicycles are, for example, deformable containers filled with oil that have an opening from which the oil may exit, for example, when the user squeezes the container. If the chain is simultaneously moved along the opening, then oil is applied to multiple sections of the chain. The drawback in this case has been demonstrated in that the oil is usually applied unevenly so that, for example, too much oil is applied to several sections of the chain, and potentially no oil at all is applied to other sections of the chain.

SUMMARY

The underlying problem of the present invention is to create a device of the type cited at the outset, which enables a uniform application of oil on the chain of a bicycle.

Described herein is a device comprising a container for the oil to be applied, an outlet through which the oil may exit from the container, and an applicator configured to repeatedly open and close the outlet during a movement of the device relative to the chain in the longitudinal direction of the chain, so that the oil located in the container is applied incrementally to the chain. In the ideal case, it may thus be achieved that the oil is distributed very uniformly across the longitudinal direction of the chain. For example, approximately one drop of oil may thereby be applied to each of the chain links of the chain.

The potential exists that the device comprises a valve that forms the outlet. It may thereby be provided that the applicator or the valve comprises a movable part which may be moved by, in particular protruding, parts of the chain, preferably moved away from the chain, so that by this mechanism the outlet is opened. In particular, the valve may be closed in a first position of the movable part and may be opened in a second position of the movable part. In this way, the part may be moved by a movement of the chain and thus the valve may be opened or closed.

It may be provided that the device has a head in which the valve is at least partially arranged. The movable part may thereby project downward in the first position out of the head or out of a section of the head such that it may come into contact with a section of the chain. In particular, it may be provided that the applicator is configured such that the movable part may be transitioned from the first position into the second through the contact of the device with the alternating narrower and wider sections of the chain. Thus, during the movement of the chain past the device in the longitudinal direction of the chain, a repeated opening and closing of the valve occurs so that little by little small amounts of the oil are applied to the chain.

The possibility exists that the movable part has a thickening and/or a rounded off, in particular essentially a hemispherical contour on its end facing the chain in the use position, preferably a partially hemispherical thickening. The rounded off contour of the movable part may thereby correspond essentially to the outer contours of typical chain links which likewise generally have curved sections. The end of the movable part provided with the rounded off contour may thus interact well with the chain.

In another advantageous embodiment, the possibility exists that the valve comprises a spring element with a first spring arm and a second spring element, which are pretensioned such that they transition the movable part into the first position closing the valve if no external pressure is exerted on the movable part by the chain.

The movable part may preferably be designed integrally with the spring element. The movable part with the spring element, which is designed integrally with the same, may be in particular an injection molded part, which may be produced, for example, from a polyamide. An advantage of this embodiment is, in particular, very low manufacturing costs. This may be particularly important, as such a device is often a disposable article.

It is proposed in one advantageous embodiment that a clamping section is designed on a free end of the second spring arm, by which the spring element is established in a clamping way within the head of the container in order to effect a secure retention of the spring element. The clamping section is preferably designed such that it engages under the thread flank of an internal thread that is designed on an internal side of the head.

In a particularly advantageous embodiment, the possibility exists that the two spring arms define an angle between approximately 35° and approximately 45° in the mounted state. A sufficiently high mechanical pre-tensioning of the spring element is thus achieved. In a non-installed state, the two spring arms may define, in particular, an angle of approximately 90°.

In a preferred embodiment, it is proposed that the movable part has a closing element on its end facing the chain in the use position, and the closing element engages in an outlet opening of the head. In a particularly preferred embodiment, it may be provided that an exterior side of the closing element is designed with a plurality of grooves which extend in the longitudinal direction of the closing element. These grooves of the closing element may facilitate the flowing past of the oil in the open state of the valve in an advantageous way.

It is furthermore possible that the movable part has an interior head whose outer diameter is greater than the inner diameter of the outlet opening, wherein the head contacts an inner edge of the outlet opening in a closed state of the valve. Due to these measures, the outlet opening may be securely closed.

It may be provided that the device comprises a guide, which, during movement of the device relative to the chain in the longitudinal direction of the chain, retains the device in a position in which the applicator may come into contact with the chain. In particular, the guide may contact the outer sides of the chain, and may comprise two strips and/or a recess through which the chain may extend. In this way, it is guaranteed that the chain interacts with the movable part when running past the device in order to ensure an application of the oil on the chain.

The potential exists that the device comprises a pre-meter, preferably a pre-meter positioned in the container, with which, in particular, an amount of the oil located in the container may be made available for exit onto the chain. The pre-metered amount of oil, pre-metered by the pre-meter, may correspond to that amount which is necessary for oiling a chain of a bicycle. By this mechanism, it is prevented that too much oil is applied to the chain.

BRIEF DESCRIPTION OF THE DRAWINGS

Other features and benefits of the present invention become clear based on the subsequent description of preferred embodiments with reference to the included figures. As shown in:

FIG. 7 a side view of a chain of a bicycle and the device according to FIG. 1, wherein the position of the device relative to the chain is such that the outlet of the device is closed;

FIG. 8 a cutaway view according to Arrows VIII-VIII in FIG. 7;

FIG. 9 a perspective view of the chain and the device according to FIG. 1 in a partially cutaway view and the position according to FIG. 7;

FIG. 10 a detail according to Arrow X in FIG. 8;

FIG. 11 a side view of the chain and the device according to FIG. 1, wherein the position of the device relative to the chain is such that the outlet of the device is open;

FIG. 12 a cutaway view according to Arrows XII-XII in FIG. 11;

FIG. 13 a perspective view of the chain and the device according to FIG. 1 in a partially cutaway view and the position according to FIG. 11;

FIG. 14 a detail according to Arrow XIV in FIG. 12;

FIG. 25 a side view of the chain and the device according to FIG. 15, wherein the position of the device relative to the chain is such that the outlet of the device is open;

FIG. 26 a cutaway view according to Arrows XXVI-XXVI in FIG. 25;

FIG. 27 a perspective view of the chain and the device according to FIG. 15 in a partially cutaway view and the position according to FIG. 25;

FIG. 28 a detail according to Arrow XXVIII in FIG. 26;

In the figures, identical or functionally identical parts are provided with the same reference numerals.

DETAILED DESCRIPTION

Figure 1:
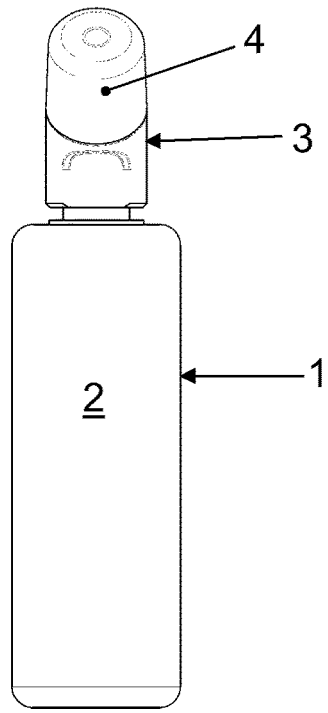
FIG. 1 a side view of a device for applying oil to a chain of a two-wheeler, in particular a bicycle, which is designed with a protective cover according to a first embodiment of the present invention.
Figure 2:
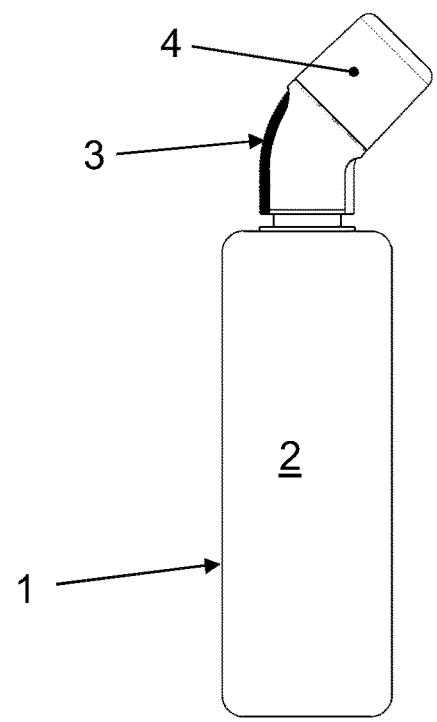
FIG. 2 a side view of the device according to FIG. 1 rotated by 90°.
Figure 3:
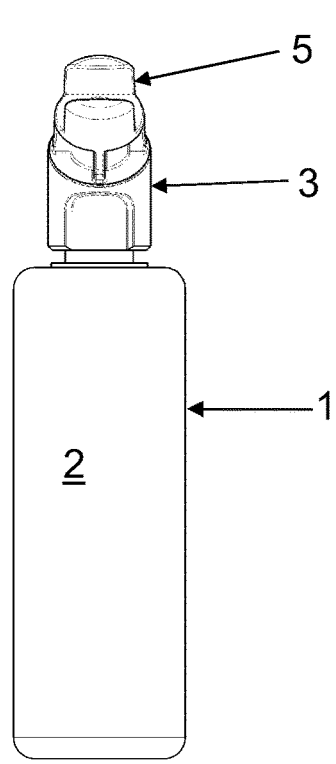
FIG. 3 a side view corresponding to FIG. 1 of the device according to FIG. 1 without the protective cover.
Figure 4:
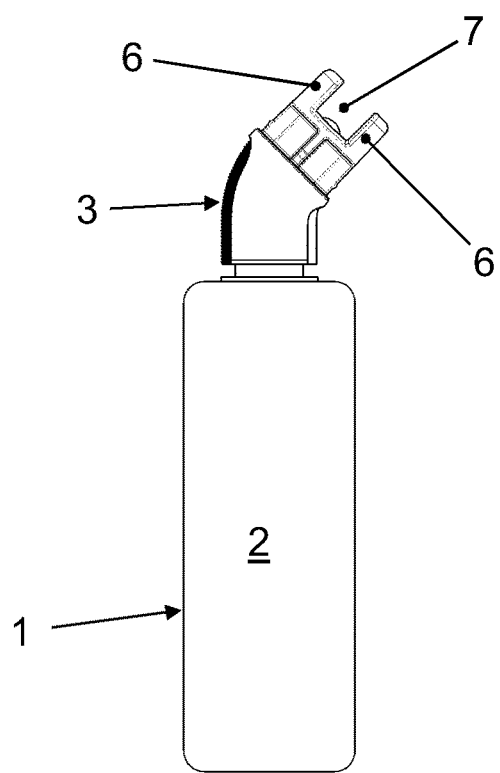
FIG. 4 a side view corresponding to FIG. 2 of the device according to FIG. 1 without the protective cover.

The first embodiment of the device 1 according to the invention reproduced in FIGS. 1 through 14 comprises a container 2 in which oil for a chain of a two-wheeler may be stocked. A head 3, on which a protective cover 4 may be applied (see FIG. 1 and FIG. 2), is positioned on the upper side of container 2 shown in FIG. 1 through FIG. 4.

A guide 5, positioned on head 3, comprises essentially two guide strips 6 which leave a recess 7 for a chain therebetween. Furthermore, an outlet (see FIG. 10) designed as valve 8 and an applicator 9 (see FIG. 9) are positioned in head 3 and will be subsequently described in greater detail.

Figure 5:
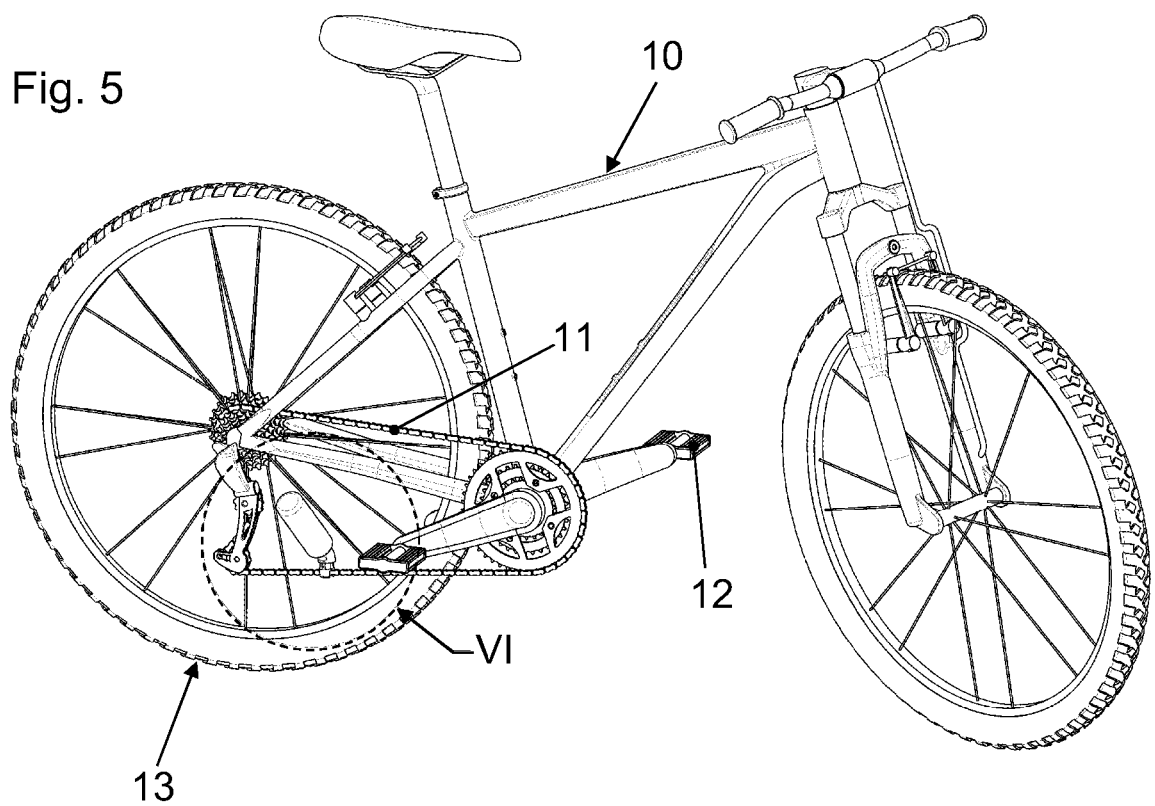
FIG. 5 a perspective view of a bicycle, on whose chain oil is applied using a device according to FIG. 1.
Figure 6:
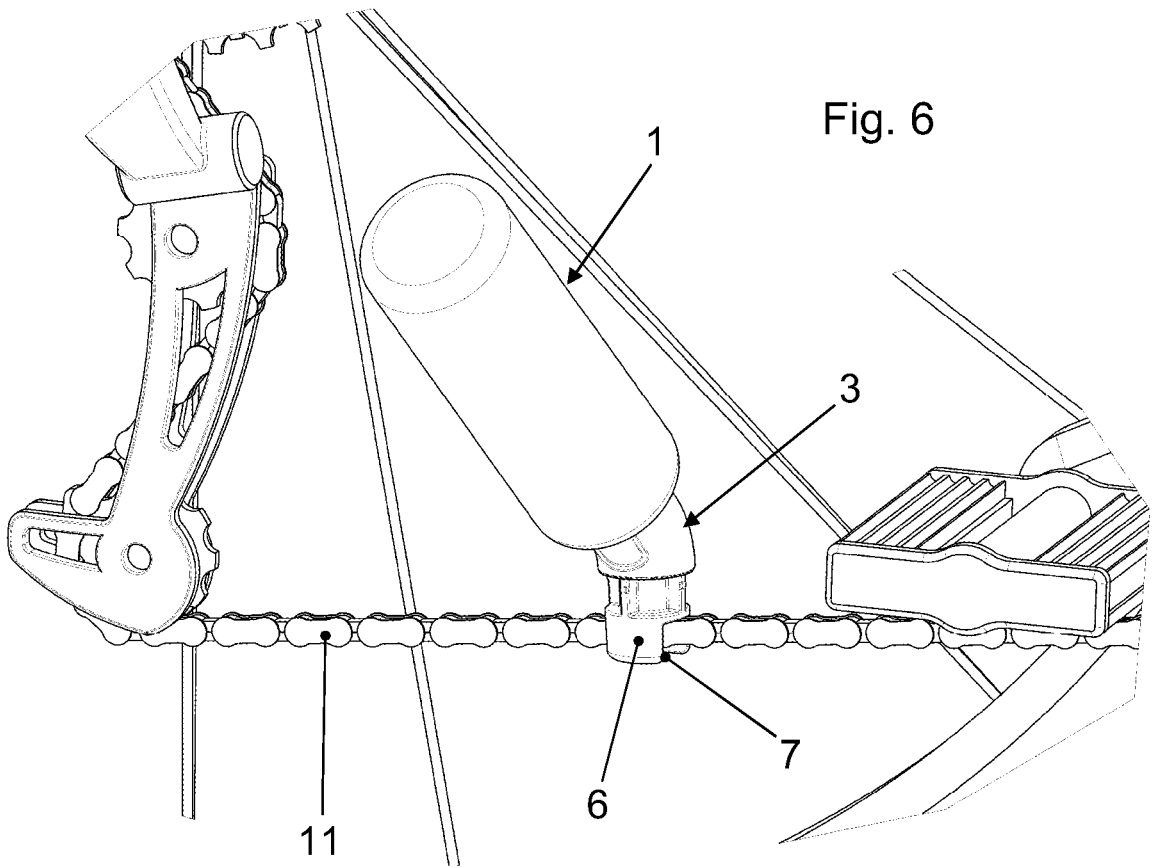
FIG. 6 a detail according to Arrow VI in FIG. 5.
Figure 15:
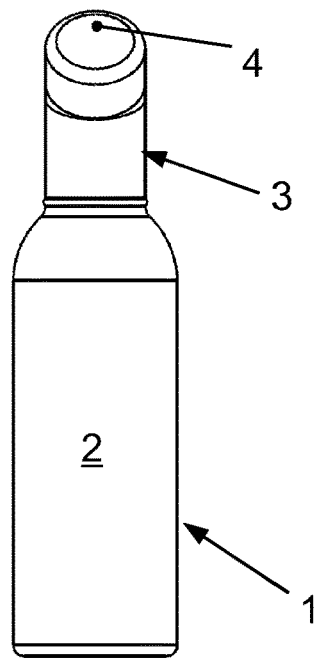
FIG. 15 a side view of a device for applying oil to a chain of a two-wheeler, in particular a bicycle, which is designed with a protective cover according to a second embodiment of the present invention.
Figure 16:
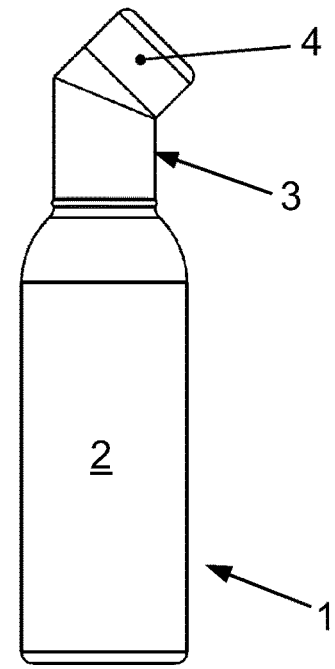
FIG. 16 a side view of the device according to FIG. 15 rotated by 90°.
Figure 17:
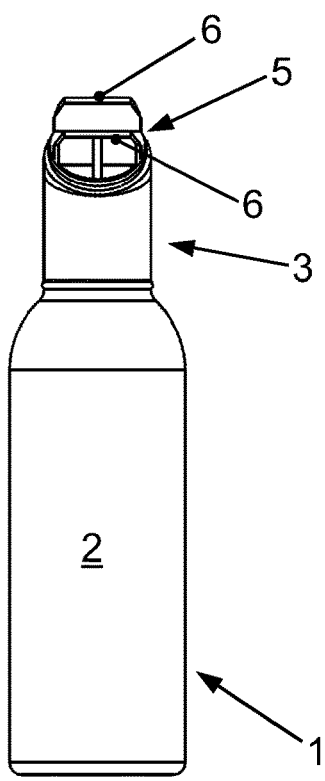
FIG. 17 a side view corresponding to FIG. 15 of the device without the protective cover.
Figure 18:
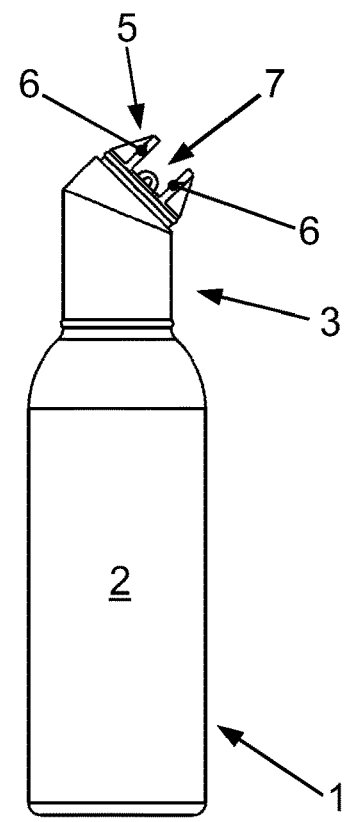
FIG. 18 a side view corresponding to FIG. 16 of the device without the protective cover.

A bicycle 10, on whose chain 11 oil is applied using the depicted embodiment of device 1, is reproduced in FIG. 5 and FIG. 6. Device 1 is thereby retained such that head 3 points downward and chain 11 extends through recess 7 so that the two guide strips 6 are positioned lateral to chain 11, in particular, partially contact chain 11 depending on the thickness of the same.

In this position, chain 11 may be moved relative to device 1, for example, by moving a pedal 12 of bicycle 10, wherein the rear wheel 13 of bicycle 10 is, for example, raised up in order to prevent forward motion of bicycle 10. During this relative movement, applicator 9 applies oil to chain 11, wherein the application is concluded after one complete revolution of chain 11.

FIG. 9 and FIG. 10 show that valve 8 comprises a movable part 14, that has a partially hemispherical thickening 15 on its end facing away from the container, or on its lower end in the figures. Movable part 14 extends through a sleeve 16, encompassed by valve 8 and mounted in head 3, from which sleeve part 14 projects upwardly and downwardly. Part 14 is movable in the axial direction of sleeve 16.

The upper end 17 of movable part 14 is designed as a cone and has an outer diameter at the end which is greater than the inner diameter of sleeve 16. By this mechanism, in the lower position of part 14 reproduced in FIG. 10, end 17 contacts the inner wall of sleeve 16 such that valve 8 or the outlet formed by valve 8 is closed.

Valve 8 further comprises a spring 18, whose lower side contacts the upper side of thickening 15 of movable part 14. If no pressure is exerted on thickening 15 from below, then the spring thus presses movable part 14 downward so that valve 8 or the outlet formed by valve 8 is closed by the contact of end 17 of part 14 on the inner wall of sleeve 16.

A typical chain 11 of a bicycle 10 has alternating narrower and wider sections 19, 20 of the outer and inner chain links 21, 22 in the longitudinal direction of chain 11 (see FIG. 9 and FIG. 10). At the position reproduced in FIG. 10, partially hemispherical thickening 15 of movable part 14 is positioned in a narrower section 19 of outer and inner chain links 21, 22 so that chain 11 exerts no pressure on thickening 15. A movement of chain 11 upward is thereby prevented by projections 23 of head 3 positioned next to movable part 14, said projections contacting wider sections 20 of outer and inner chain links 21, 22.

In the view according to FIG. 10, an opening 24 is visible through which the oil may flow downward from container 2. In the closed position of valve 8 reproduced in FIG. 10, the oil located in said opening 24 may not flow downward through valve 8 forming the outlet and leave the device. Thus, in the position according to FIG. 10, no oil exits from the device.

When chain 11 is moved in the longitudinal direction relative to device 1, there results, after the position reproduced in FIG. 10, the position reproduced in FIG. 14, in which partially hemispherical thickening 15 of movable part 14 is situated in a wider section 20 of outer and inner chain links 21, 22. This wider section 20 then presses movable part 14 upward in FIG. 14, so that conical end 17 of part 14 moves upward from the inner wall of sleeve 16 and thus opens valve 8 or the outlet formed by valve 8 (see FIG. 14).

In this position, oil may enter from container 2 through opening 24 into sleeve 16. The oil exits from the lower end of sleeve 16 and runs past movable part 14 on the outer sides of thickening 15 downward to chain 11. Thickening 15 is additionally provided with grooves 25 distributed across the circumference which facilitate the flowing past of the oil.

Valve 8 of device 1 may be configured in particular such that when chain 11 moves past head 3 of device 1, for example, in each case approximately one drop of oil per chain link is applied to chain 11. In addition, during the movement of chain 11 relative to device 1, the user may slightly manually deform container 2 in order to support the oil outflow.

It may be provided that device 1 comprises pre-meter (not shown) which is positioned in particular in container 2. The pre-meter may guarantee that an amount of oil located in container 2 is provided for discharge on chain 11, and is thus pre-metered, wherein this amount may approximately correspond to that amount which is necessary for oiling a chain of a bicycle.

With reference to FIGS. 15 through 30, a second embodiment of device 1 for the application of oil on a chain 11 of a two-wheeler, in particular a bicycle 10, will be subsequently described in greater detail.

Device 1 once again comprises a container 2 in which oil may be stored for a chain 11 of a two-wheeler. A head 3, on which a protective cover 4 may be applied in order to be able to close container 2 when not in use (see FIG. 15 and FIG. 16), is positioned on the upper side of container 2 shown in FIG. 15 through FIG. 18.

A guide 5 is positioned on head 3, which in this embodiment likewise essentially comprise two guide strips 6 between which a recess 7 is formed for engaging a chain 11 of the two-wheeler. Furthermore, an outlet (see FIG. 24) designed as valve 8 and an applicator 9 (see FIG. 23) are positioned in head 3 and will be subsequently described in greater detail.

Figure 19:
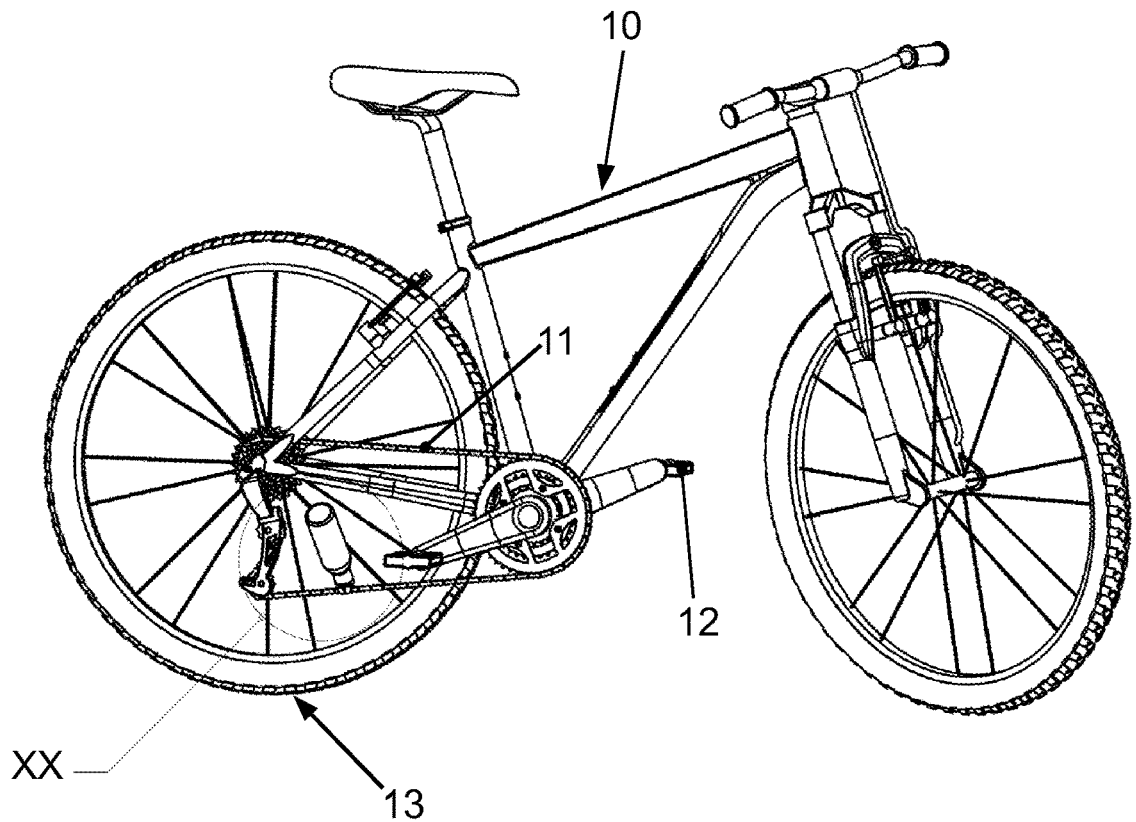
FIG. 19 a perspective view of a bicycle, on whose chain oil is applied using a device according to FIG. 15.
Figure 20:
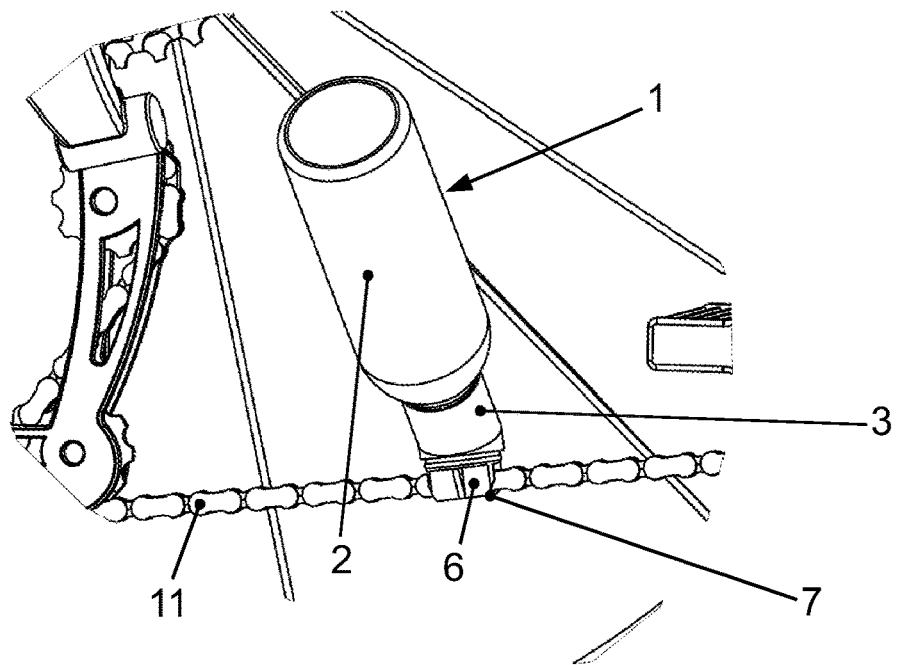
FIG. 20 a detail according to Arrow XX in FIG. 19.
Figure 21:
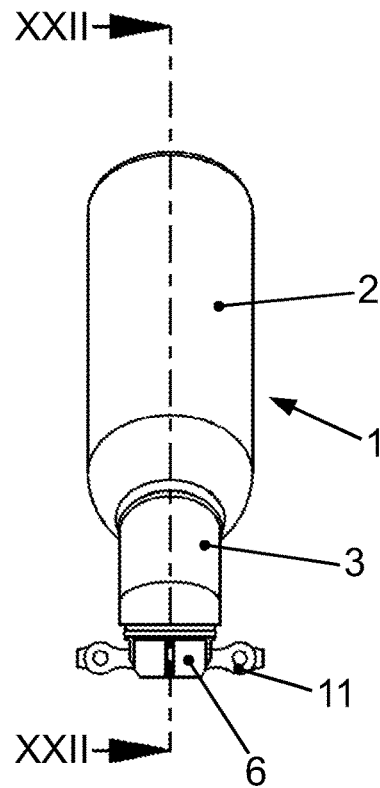
FIG. 21 a side view of a chain of a bicycle and the device according to FIG. 15, wherein the position of the device relative to the chain is such that the outlet of the device is closed.

A bicycle 10 is shown in FIG. 19 and FIG. 20, on whose chain 11 oil may be applied with the aid of the represented embodiment of device 1. Device 1 is thereby retained such that head 3 points downward in the direction of chain 11, and chain 11 extends through recess 7 of the two guide strips 6 such that the two guide strips 6 are positioned laterally to chain 11, in particular partially contact chain 11 depending on the thickness of the same.

In this position, chain 11 may be moved relative to device 1, for example, by moving a pedal 12 of bicycle 10, wherein the rear wheel 13 of bicycle 10 is, for example, raised up in order to prevent forward motion of bicycle 10. During this relative movement, applicator 9 of device 1 applies oil to chain 11, wherein the application is concluded after one complete revolution of chain 11.

Figure 23:
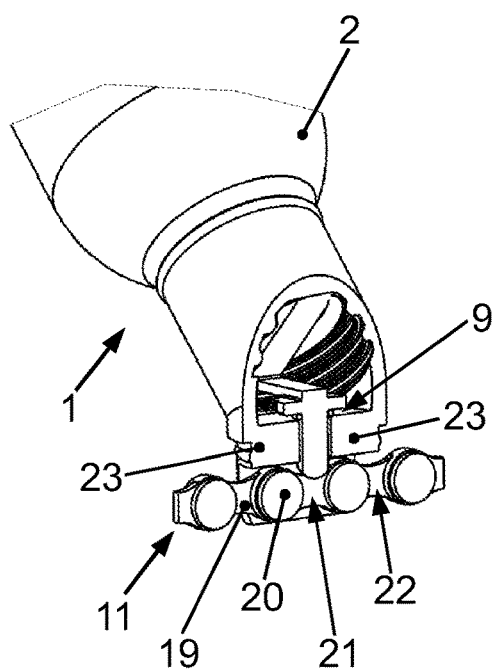
FIG. 23 a perspective view of the chain and the device according to FIG. 15 in a partially cutaway view and the position according to FIG. 21.
Figure 24:
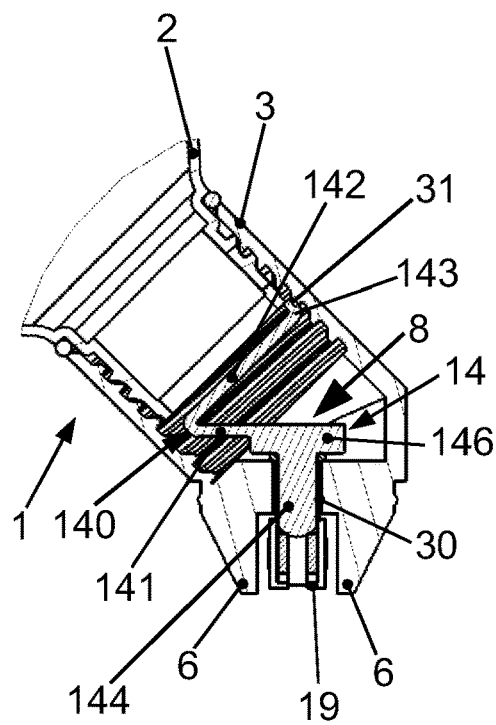
FIG. 24 a detail according to Arrow XXIV in FIG. 22.
Figure 30:
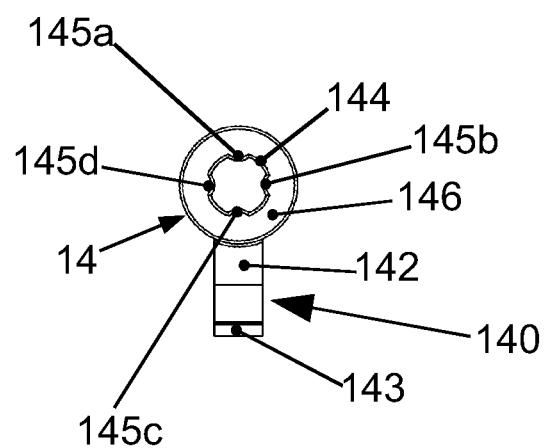
FIG. 30 a bottom view of the movable part according to FIG. 29.
Figure 29:
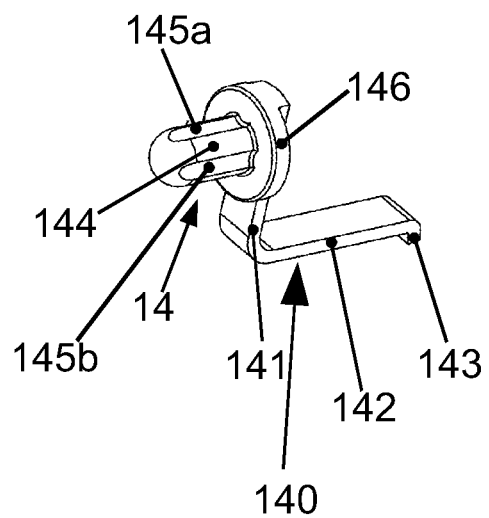
FIG. 29 a perspective view of a movable part and a spring element of a valve of the device according to FIGS. 15 through 28.

It is clear from FIGS. 23 and 24, that valve 8 comprises a movable part 14, by which the outlet of container 2 may be opened or closed during the use of device 1. Movable part 14 is shown in FIG. 29 and FIG. 30 in detail in a state in which it is not installed in container 2. Movable part 14 in this embodiment is designed as integral with a spring element 140, which comprises a first spring arm 141 and a second spring arm 142 which, in a non-installed state, preferably define an angle of 90° with one another. Movable part 14 with spring element 140 designed integrally with the same is preferably an injection molded part, which may, in particular, be produced from a polyamide. Basically, movable part 14 and spring element 140 may also be designed as separate components which are connected to one another in a suitable way.

A clamping section 143 is designed on a free end of second spring arm 142, by which clamping section spring element 140 may be clampingly fixed within head 3 of container 2 during assembly. Movable part 14 has a closure member 144 on an end facing away from container 2 or on a lower end in FIGS. 23 and 24, said closure member being formed such that it may be inserted into an outlet opening 30 of head 3 of container 2 and, in the closed state of device 1, which is shown in FIGS. 21 through 24, projects downward from outlet opening 30. Movable part 14 is movable in the axial direction of outlet opening 30. As is clear in FIGS. 29 and 30, four grooves 145a, 145b, 145c, 145d are designed on an outer side of closure member 144, said grooves extending in the longitudinal direction of closure member 144. Furthermore, movable part 14 has a circular head 146, whose outer diameter is greater than the inner diameter of outlet opening 30. By this mechanism, in the lower position of movable part 14, reproduced in FIG. 24, the head contacts the inner edge of outlet opening 30 such that valve 8 or the outlet of device 1 formed by valve 8 is closed.

In the installed state, clamping section 143 engages below a thread flank of internal thread 31, which is formed on an inner side of head 3, and by which head 3 is screwed to container 2, which in turn has an external thread. Depending on which of the thread flanks of internal thread 31 is engaged by clamping section 143, the two spring arms 141, 142 define an angle between approximately 35° and approximately 45° with one another so that by pressing the two spring arms 141, 142 together, a mechanical pre-tensioning may be generated which acts on the movable part. In the embodiment specifically shown here, the angle between the two spring arms 141, 142 in the installed state of spring element 140 is 42°. If no pressure is exerted from below on closure member 144, then spring element 140 presses movable part 14 downward due to the mechanical pre-tensioning of the two spring arms 141, 142, so that the outlet of device 1 formed by valve 8 is closed by the contact of circular head 146 on the inner edge of outlet opening 30.

A typical chain 11 of a bicycle 10 has alternating narrower and wider sections 19, 20 of the outer and inner chain links 21, 22 in the longitudinal direction of chain 11 (see FIG. 23). At the position reproduced in FIGS. 23 and 24, closure member 144 of movable part 14 is positioned in a narrower section 19 of outer and inner chain links 21, 22 so that chain 11 exerts no pressure on closure member 144. An additional movement of chain 11 upward is thereby prevented by projections 23 of head 3 positioned next to closure member 144 of movable part 14, said projections contacting wider sections 20 of outer and inner chain links 21, 22.

Figure 22:
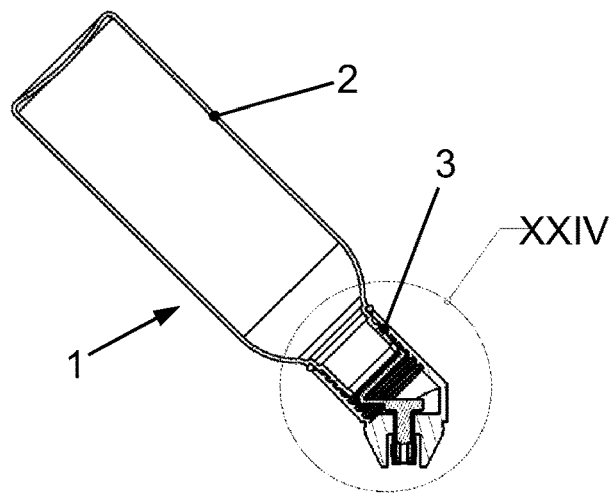
FIG. 22 a cutaway view according to Arrows XXII-XXII in FIG. 21.

In the closed position of valve 8 reproduced in FIGS. 22 through 24, no oil may flow downward from outlet opening 30 and emerge out of device 1.

When chain 11 is moved in the longitudinal direction relative to device 1, there results, after the position reproduced in FIGS. 21 through 24, the position reproduced in FIGS. 25 through 28, in which closure member 144 of movable part 14 is situated in a wider section 20 of outer and inner chain links 21, 22. This wider section 20 then presses from below against closure member 144 of movable part 14 so that valve 8 opens. In this position, the oil runs on the outer side of closure member 144 past movable part 14 downward on chain 11. Grooves 145a, 145b, 145c, 145d of closure member 144 facilitate the flowing past of the oil.

In may also be provided in this embodiment that device 1 comprises a pre-meter, not explicitly shown, which is positioned in particular in container 2. The pre-meter may guarantee that an amount of oil located in container 2 is provided for outlet on chain 11, and is thus pre-metered, wherein this amount may approximately correspond to that amount which is necessary for greasing a chain of a bicycle.

What is claimed is:

1. A device for applying oil on a chain of a two-wheeler, comprising:
   a container for the oil to be applied;
   an outlet through which the oil may exit from the container;
   an applicator configured to repeatedly open and close the outlet during a movement of the device relative to the chain in the longitudinal direction of the chain so that the oil located in the container is applied incrementally to the chain; and
   a guide configured to retain the device in a position in which the applicator contacts the chain during movement of the device relative to the chain in the longitudinal direction of the chain, wherein the guide comprises two strips and/or a recess through which the chain may extend.

2. The device of claim 1, wherein the applicator comprises a moveable part that is movable by protruding portions of the chain such that the outlet is opened.

3. The device of claim 2, further comprising a valve that forms the outlet.

4. The device of claim 3, wherein the valve comprises the movable part.

5. The device of claim 3, wherein the valve comprises a sleeve which the movable part is movable in an axial direction of the sleeve.

6. The device of claim 3, wherein the valve is closed in a first position of the movable part and open in a second position of the movable part.

7. The device of claim 6, wherein the valve comprises a spring that is pre-tensioned such that the spring transitions the movable part into the first position closing the valve in the event no external pressure is exerted on the moveable part by the chain.

8. The device of claim 6, wherein the valve comprises a spring element having a first spring arm and a second spring arm that are pre-tensioned such that the first and second spring arms transition the movable part into the first position closing the valve in the event no external pressure is exerted on the movable part by the chain.

9. The device of claim 8, wherein the movable part is designed integrally with the spring element.

10. The device of claim 8, wherein the first and second spring arms define an angle with one another between approximately 35° and approximately 45° in an installed state.

11. The device of claim 8, further comprising a clamping section disposed on a free end of the second spring arm to clampingly fix the spring element within a head of the container.

12. The device of claim 11, wherein the clamping section is configured to engage below a thread flank of an internal thread on an inner side of the head.

13. The device of claim 11, wherein the movable part has a closure member on its outward extending end, the closure member engaging into an outlet opening of the head.

14. The device of claim 13, wherein a plurality of grooves are disposed on an outer side of the closure member, the grooves extending in the longitudinal direction of the closure member.

15. The device of claim 13, wherein the movable part has an internal head whose outer diameter is greater than an inner diameter of the outlet opening, wherein the internal head contacts an inner edge of the outlet opening in a closed position of the valve.

16. The device of claim 3, further comprising a head in which the valve is at least partially positioned.

17. The device of claim 16, wherein the movable part projects outward from the head in a first position such that the moveable part is capable of contacting a section of the chain.

18. The device of claim 16, wherein the head has an opening through which oil may flow from the container to the valve.

19. The device of claim 2, wherein the applicator is configured such that the movable part is capable of being transitioned from a first position into a second through the contact of the device with the alternatingly narrower and wider sections of the chain.

20. The device of claim 2, wherein the movable part has a thickening and/or a rounded off, hemispherical contour on its outward extending end.

21. The device of claim 1, wherein the guide contacts the outer sides of the chain.

* * * * *